United States Patent
Rodriguez et al.

(10) Patent No.: US 6,757,114 B1
(45) Date of Patent: Jun. 29, 2004

(54) OPTICAL FILTER ALIGNER/SEPARATOR AND SYSTEM USING THE SAME

(75) Inventors: Lou Rodriguez, Savage, MD (US); Gary Kles, Sykesville, MD (US)

(73) Assignee: Ciena Corporation, Linthicum, MD (US)

(*) Notice: Subject to any disclaimer, the term of this patent is extended or adjusted under 35 U.S.C. 154(b) by 0 days.

(21) Appl. No.: 09/999,530

(22) Filed: Oct. 31, 2001

(51) Int. Cl.[7] ................................................ G02B 5/22
(52) U.S. Cl. ..................... 359/892; 359/885; 248/99; 248/98
(58) Field of Search ............................... 359/892, 885; 40/744, 729, 730, 731, 732; 248/489, 498, 494; 428/98, 99

(56) References Cited

U.S. PATENT DOCUMENTS 3,564,261 A * 2/1971 Hadermann et al. ........ 250/229
5,390,800 A * 2/1995 Tucker ....................... 211/85.2
5,846,302 A * 12/1998 Putro ............................. 96/66
6,102,556 A * 8/2000 Lieberman et al. ......... 362/433

* cited by examiner

Primary Examiner—Drew A. Dunn
Assistant Examiner—Joshua L Pritchett
(74) Attorney, Agent, or Firm—Michael R. Cammarata; David L. Soltz; David A. Fox (57) ABSTRACT

An optical filter aligner/separator device for retaining optical filters in a desired position, the optical filters having an optical filter height, the device includes: a top frame having a top frame cut out section; a bottom frame having a bottom side and a bottom frame cut out section, the bottom frame coupled to the top frame, the bottom frame cut out section aligning with the top frame cut out section; and a wire mesh disposed between the top frame and the bottom frame, the wire mesh disposed at the cut out section, the wire mesh having a height from the bottom side of the bottom frame that is less than the optical filter height.

17 Claims, 9 Drawing Sheets

OPTICAL FILTER ALIGNER/SEPARATOR AND SYSTEM USING THE SAME

BACKGROUND OF THE INVENTION

1. Field of Invention

The invention relates to an optical filter aligner/separator and an optical filter selection system utilizing the same.

2. Description of Related Art

Optical filters are employed in a variety devices used to implement optical communications networks. For example, in a wavelength division multiplexing (WDM) optical communications network, optical filters may be used to select certain wavelengths in devices such as optical add-drop multiplexers. Individual optical filters are often formed in a filter array. The filter array is constructed, for example, by depositing alternating layers of high and low refractive index dielectric materials upon a substrate. Slits are cut into the material to form a filter array that includes a grid of optical filters. These optical filters are relatively small with a size of about 1.1 mm×1.1 mm.

When the slits are created to form the individual optical filters, the slits do not pass all the way through the material, thereby allowing the substrate maintain the positional relationship of the optical filters. The optical surface of the optical filters (i.e., the surface opposite the substrate) is then laid in an adhesive material, such as wax, so that the substrate is exposed. The substrate is then removed so that the adhesive material maintains the positional relationship of the individual optical filters.

Part of the manufacturing process includes determining the characteristics of each optical filter. The characteristics may be determined by directing different wavelengths of light at the filters and recording how the filters respond. The location and optical characteristics of each optical filter is stored.

Once the filter array of optical filters has been constructed and the optical filter characteristics determined, the filters may be employed in optical devices. This requires that a specific filter having desired optical characteristics be removed from the filter array. Currently, this is performed by instructing an operator to manually select a specific optical filter and by moving the optical filter using tweezers from the filter array to a pallet. The pallets have openings, or dimples, to hold each optical filter. When the operator selects the specific optical filter, the optical filters located adjacent to the selected optical filter may be dislodged so that the operator can grasp the selected optical filter with the tweezers.

The procedure for moving the optical filter from the filter array to the pallet is time consuming and is prone to errors by the operator. In addition, by dislodging the optical filters from their original positions, it may be difficult to locate a particular optical filter at a later time.

SUMMARY OF THE INVENTION

An optical filter aligner/separator device for retaining optical filters in a desired position, the optical filters having an optical filter height, the device includes: a top frame having a top frame cut out section; a bottom frame having a bottom side and a bottom frame cut out section, the bottom frame coupled to the top frame, the bottom frame cut out section aligning with the top frame cut out section; and a wire mesh disposed between the top frame and the bottom frame, the wire mesh disposed at the cut out section, the wire mesh having a height from the bottom side of the bottom frame that is less than the optical filter height.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
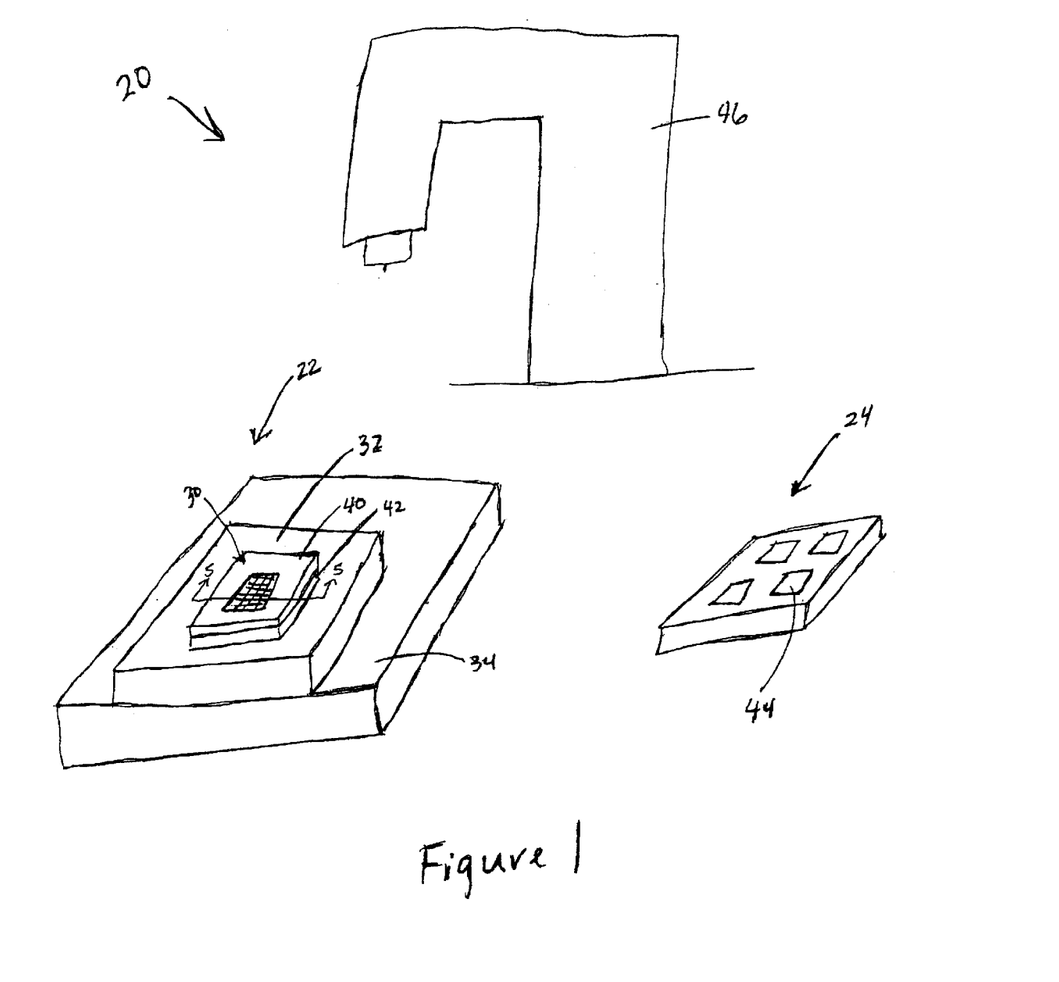
FIG. 1 is a perspective view of an automated optical filter selection system with an optical filter aligner/separator device at a first station and a plurality of pallets at a second station.

Referring to FIG. 1, an automated optical filter selection system 20 is illustrated. Automated optical filter selection system 20 includes a first station 22 and a second station 24. First station 22 includes an optical filter aligner/separator 30 is mounted on a support member 32, which is mounted on a thermal member 34. Second station 24 includes a plurality of pallets 44. A robotic arm 46 is located between first station 22 and second station 24. As described in further detail herein, in operation the robotic arm 46 selects an optical filter from first station 22 and deposits the optical filter in a pallet at station 24.

Figures 2, 3:
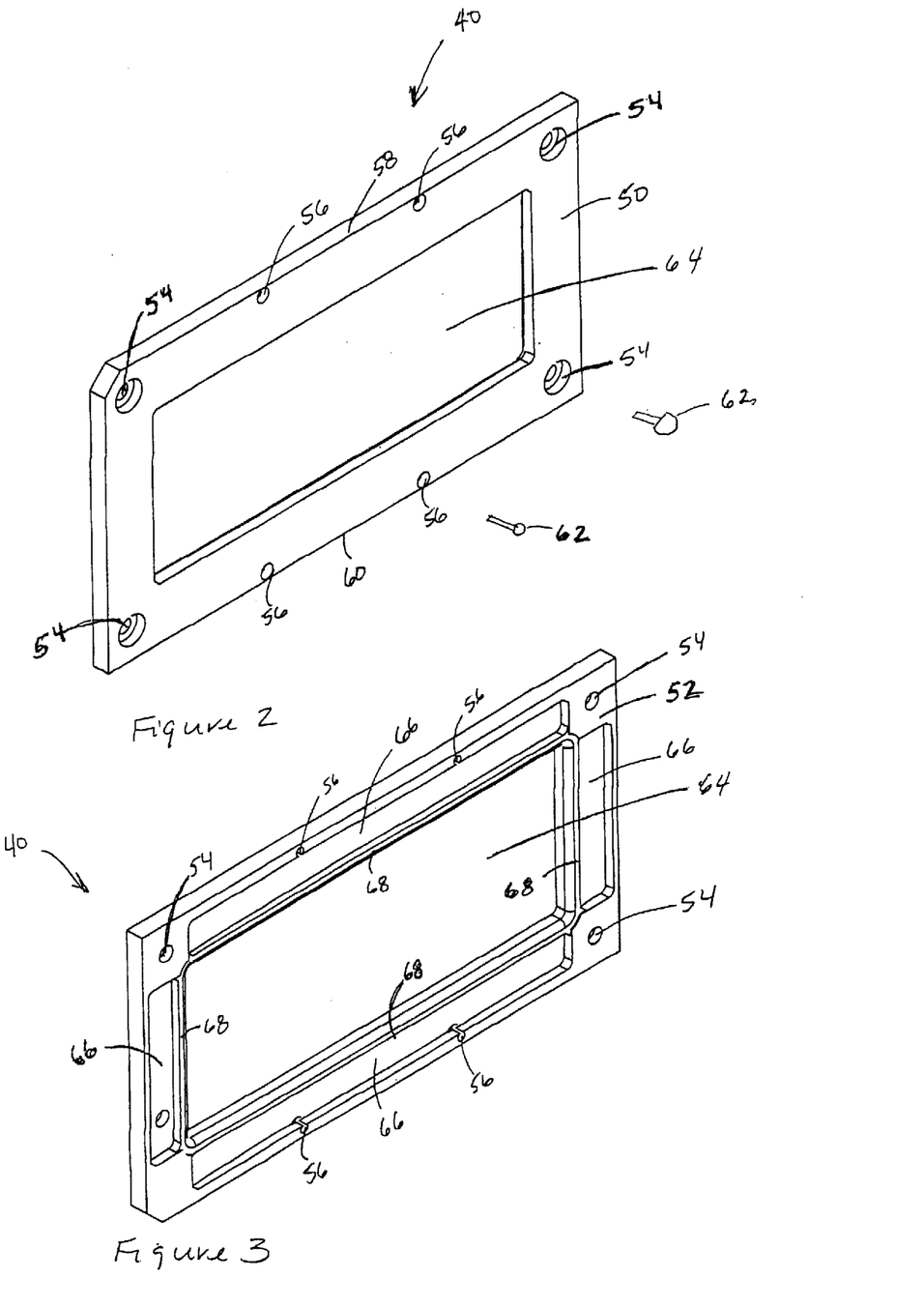
FIG. 2 is a perspective view of a top surface of a top frame of the optical filter aligner/separator of FIG. 1.
FIG. 3 is a perspective view of a bottom surface of the top frame of FIG. 2.

Optical filter aligner/separator 30 includes a top frame 40 mounted on a bottom frame 42. Referring to FIGS. 2–3, top frame 40 of optical filter aligner/separator 30 is illustrated in more detail. Top frame 40 includes a top surface 50 and a bottom surface 52. Top frame 40 is generally rectangular in shape with apertures 54 located at each corner of top frame 40. Apertures 56 are also located adjacent a side 58 and a side 60. Apertures 54 and 56 continue from top surface 50 through to bottom surface 52. Apertures 54 and 56 are sized to receive a fastener 62, such as a bolt or a screw or the like. Top frame 40 also includes a cut out section 64 that is generally rectangular in shape.

Bottom surface 52 includes a plurality of notches 66 that are cut out from bottom surface 52. Notches 66 do not extend through to top surface 50. Notches 66 are generally rectangular in shape and do not interfere with apertures 54. An edge 68 remains between notch 66 and cut out section 64.

Figure 4:
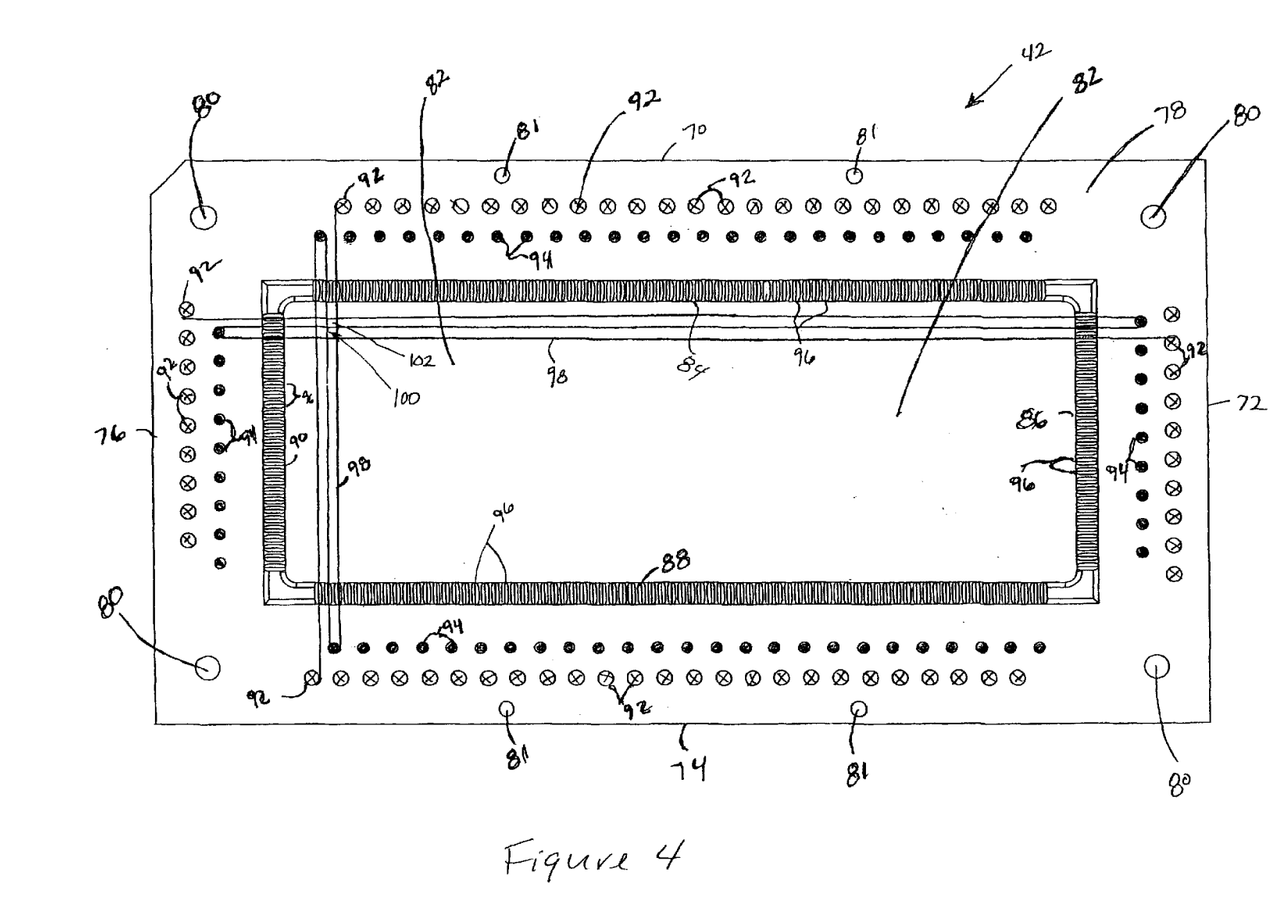
FIG. 4 is a top view of a bottom frame of the optical filter aligner/separator of FIG. 1.
Figure 5:
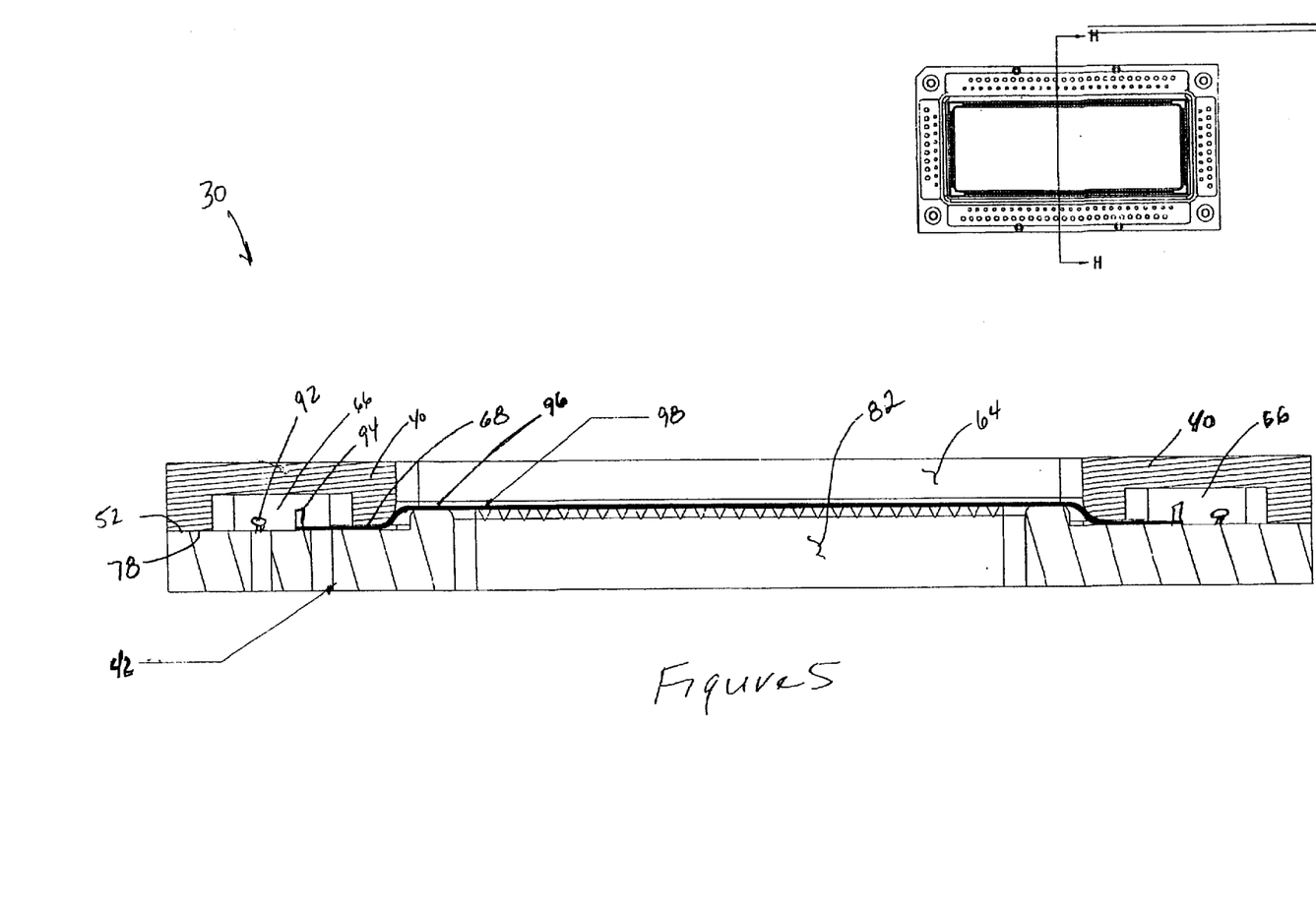
FIG. 5 is a partial cross-section view of the optical filter aligner/separator of FIG. 1.

Referring to FIG. 4, a top view of bottom frame 42 of optical filter aligner/separator 30 is illustrated in more detail. Bottom frame 42 is generally rectangular in shape with sides 70, 72, 74, and 76 and a top surface 78. Bottom frame 42 has apertures 80 located at each corner of bottom frame 42. Apertures 81 are also located adjacent side 70 and side 74. Apertures 80 and 81 are sized to receive fastener 62 (see FIG. 2). Bottom frame 42 also includes a cut out section 82 that is generally rectangular in shape, with edges 84, 86, 88, and 90. Edges 84 and 88 are straight and parallel to each other and edges 86 and 90 are straight and parallel to each other.

Top surface 78 includes a plurality of fasteners 92 extending from top surface 78. Plurality of fasteners 92 are arranged in four rows in which each of the rows is parallel to edges 84, 86, 88, and 90. Top surface 78 also includes a plurality of posts 94 extending from top surface 78. Plurality of posts 94 are arranged in four rows in which each row is parallel to edges 84, 86, 88, and 90. The row of plurality of posts 94 is aligned between the row of plurality of fasteners 92 and edges 84, 86, 88, and 90.

Along each edge 84, 86, 88, and 90, there is a plurality of v-grooves 96. Each v-groove 96 is arranged so that v-groove 96 is perpendicular to each edge 84, 86, 88, and 90. Fasteners 92, posts 94, and v-grooves 96 are aligned so that a wire 98 is extended across cut out section 82 as described as follows: beginning with fastener 92 located adjacent side 74 at the left hand side of bottom frame 42, wire 98 is anchored at fastener 92; wire 98 then passes through v-groove 96 and crosses edge 88, across cut out section 82 and across edge 84, through v-groove 96, around post 94, through v-groove 96, across cut out section 82 through v-groove 96, around post 94, through v-groove 96, across cut out section 82, through v-groove 96, to fastener 92; wire 98 is then anchored at fastener 92. Another wire 98 (not shown) is then anchored at the next fastener 92 and the same procedure is employed to wire the next section of cut out section 82. Wire 98 is also extended perpendicular to edges 86 and 90. The same procedure as described above is employed to extend wire across cut out section 82. The result is that a wire mesh 100 with individual squares 102 is created within cut out section 82.

In an alternative embodiment, a single wire 98 extends across cut out section 82 from fastener 92 to fastener 92. Wire 98 does not turn and extend back across cut out section 82. Thus, each wire 98 only extends across cut out section 82 one time. In this embodiment, because wire 98 is secured at each end by fastener 92 and only extends once across cut out section 82, posts 94 may be eliminated. Alternatively, fasteners 92 may be replaced with any clamping means, so that wire 98 is secured and held in place across cut out section 82.

In an alternative embodiment, a single wire 98 may extend through v-grooves 96 from post 94 to post 94 across the entire cut out section 82 with fastener 92 located at either end of cut out section 82; however, in that example, if wire 98 breaks, then the entire cut out section 82 will need to be rewired. By wiring cut out section 82 as described above, in which fasteners 92 and posts 94 are utilized as described, then if wire 98 breaks, only a small portion of cut out section 82 needs to be rewired.

Referring to FIGS. 2–5, top frame 40 is arranged on top of bottom frame 42 with bottom surface 52 of top frame 40 facing top surface 78 of bottom frame 42. Apertures 54 align with apertures 80 and fastener 62 passes through both apertures 54 and 80 so as to hold top frame 40 securely in place on top of bottom frame 42. Apertures 56 align with apertures 81 so that additional fasteners 62 may be used to secure top frame 40 to bottom frame 42. Cut out section 64 aligns with cut out section 82. Cut out section 64 is generally larger than cut out section 82 so that plurality of v-grooves 96 are not located beneath top frame 40, but are exposed by cut out section 64. Fasteners 92 and posts 94 fit within notches 66. Edge 68 presses on wire 98 between post 94 and v-groove 96 to create additional tension in wire 98 so that wire 98 is tight across cut out section 82.

Figure 6:
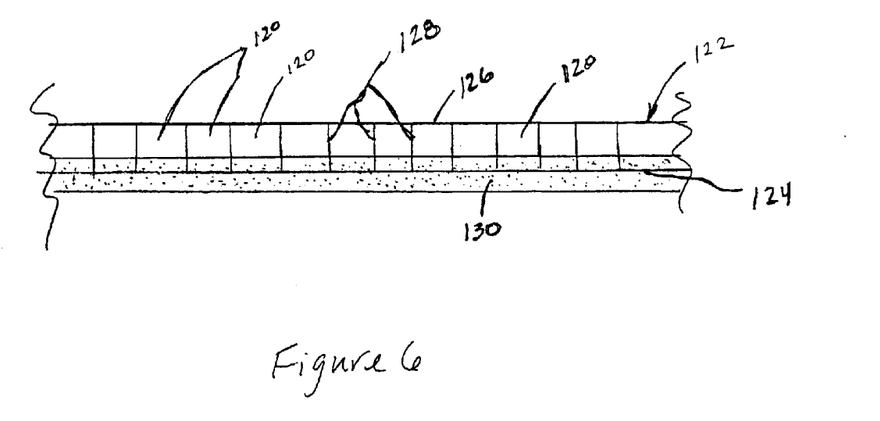
FIG. 6 is a cross-section view of a filter array in an adhesive material.

Referring to FIG. 6, optical filter selection system 20 (see FIG. 1) is employed to select an optical filter 120 from a filter array 122. FIG. 6 illustrates a cross-section of filter array 122. Filter array 122 has an optical surface 124 and a side 126. Filter array 122 also has a plurality of vertical slits 128 that are formed from optical surface 124 through to side 126, which forms a plurality of optical filters 120. Filter array 122 is pressed into a material 130 so that optical surface 124 is set into material 130. Material 130 holds each optical filter 120 in place. Preferably, material 130 has a sticky adhesive consistency that loosens as it is warmed. The preferred material is wax or a material that has similar properties to wax.

Figure 7:
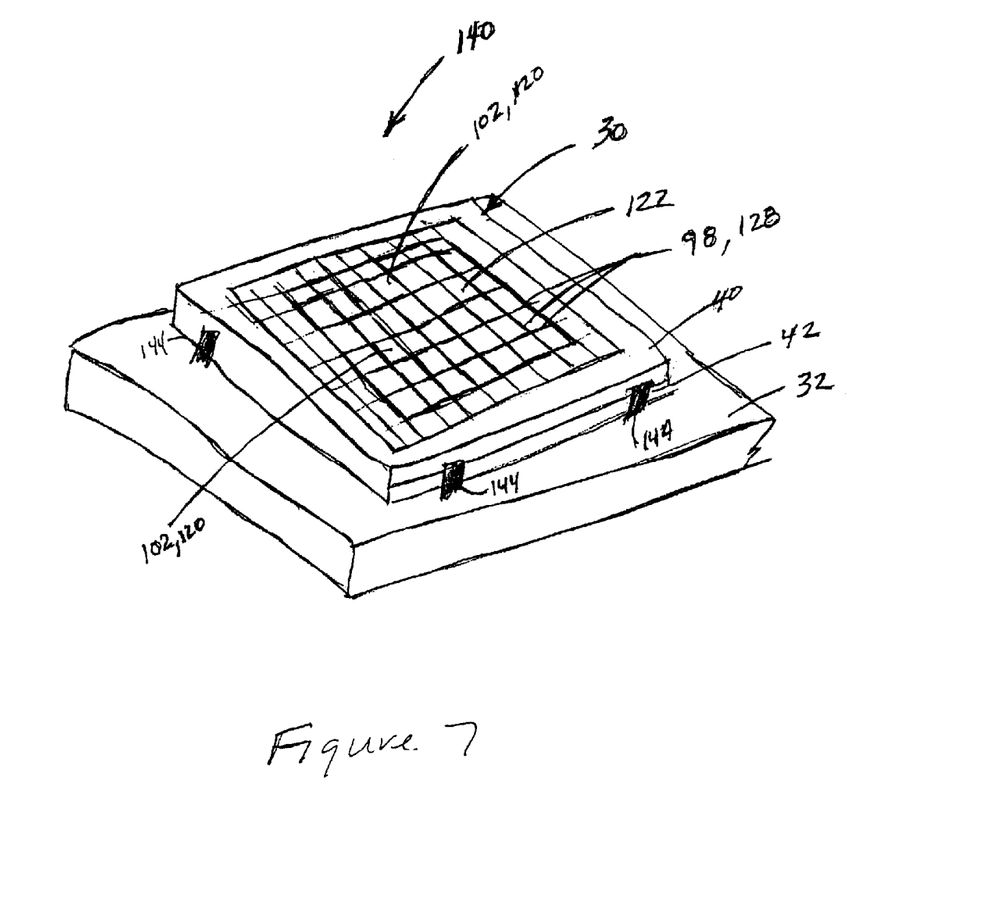
FIG. 7 is a perspective view of the filter array of FIG. 6, an optical filter aligner/separator, and a support member mounted together as a single unit.

Referring to FIG. 7, filter array 122 is illustrated with optical filter aligner/separator 30. The filter array 122, optical filter aligner/separator 30, and support member 32 are aligned and mounted together to form a single unit 140. In order to mount filter array 122, optical filter aligner/separator 30 and support member 32 into single unit 140, a series of steps are followed. Top frame 40 and bottom frame 42 are clamped together as described above to form optical filter aligner/separator 30. Filter array 122 is placed on support member 32. Optical filter aligner/separator 30 is placed over filter array 122. Slits 128 align with wires 98 so that wires 98 fit within slits 128. After slits 128 and wires 98 have been aligned, each optical filter 120 is then supported on all four sides by wire 98. In other words, each optical filter 120 fits within square 102. Filter array 122 and optical filter aligner/separator 30 can then be pushed on support member 32 so that optical filter aligner/separator 30 fits within alignment pins 144, which extend from support member 32. Optical filter aligner/separator 30 is clamped into place or may be magnetically held in place. Filter array 122, optical filter aligner/separator 30, and support member 32 can then be moved as single unit 140.

Figure 8:
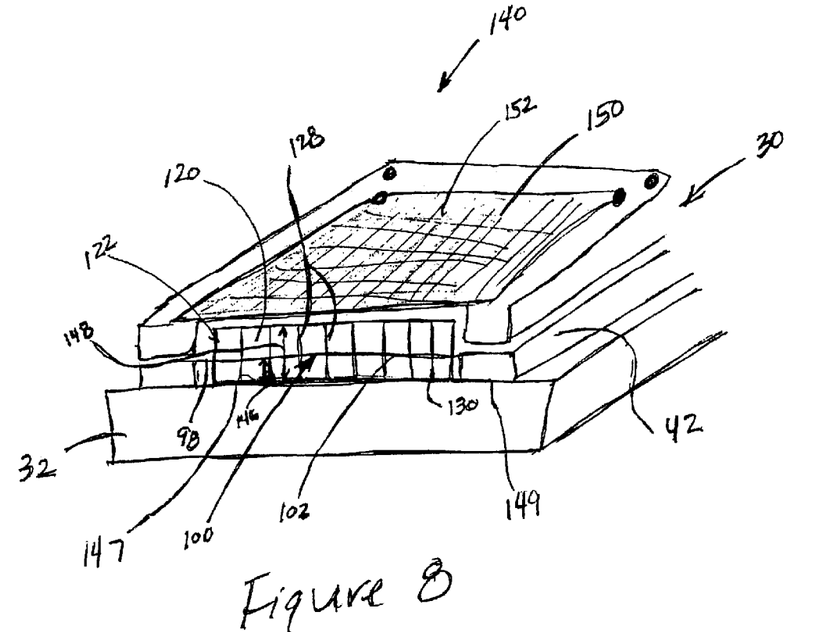
FIG. 8 is a perspective view in partial cross-section of the single unit of FIG. 7 with a screen covering the optical filter aligner/separator.

Referring to FIG. 8, the location of wire 98 with respect to optical filter 120 is illustrated. Wire 98 may be located at any location within slit 128 so long as wire 98 supports optical filter 120. For example, a height 146 of wire 98 may be measured from either a top side 147 of support 32 or a bottom side 149 of bottom frame 42. A height 148 of optical filter 120 may also be measured from top 147 of support 32 or bottom side 149 of bottom frame 42. In either event, height 146 is less than height 148 so that wire 98 is located within slit 128.

Referring still to FIG. 8, single unit 140 may be washed to remove excess material 130 (see FIG. 6). Before the washing procedure can occur, a screen 150 is placed over top surface 50 of top frame 40 of optical filter aligner/separator 30. Screen 150 is coupled to top frame 40. Screen 150 is preferably a mesh screen; however, screen 150 may be any type of screen so long as there are holes 152 in it to allow the solution from the washing procedure to reach material 130 of filter array 122, which is located in optical filter aligner/separator 30. Holes 152 must be smaller than each optical filter 120 so that optical filter 120 is held in place within optical filter aligner/separator 30. Screen 150 and individual squares 102 of wire mesh 100 hold optical filter 120 in place even if all wax is removed during washing procedure. Screen 150 is removed once the washing procedure is complete. The washing procedure is a standard procedure and is known in the art. Typically, single unit 140 is placed in a solution containing warm water and alcohol and is gently moved about to help removes excess material 130.

Figure 9:
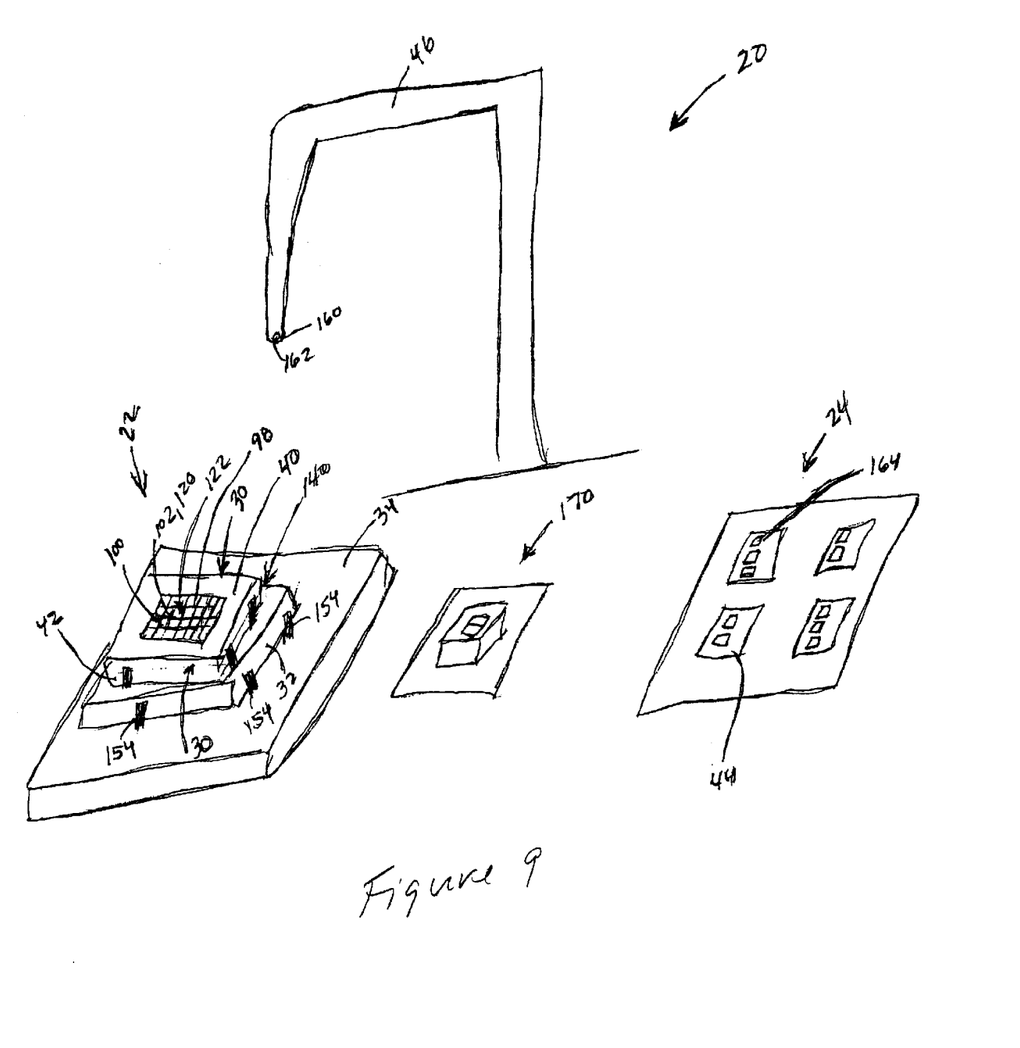
FIG. 9 is a perspective view of the automated optical filter selection apparatus of FIG. 1 with an optional third station.

Referring to FIG. 9, automated optical filter selection apparatus 20 is illustrated with optical filter aligner/separator 30 and filter array 122. Single unit 140 is then properly aligned on thermal member 34. Thermal member 34 has alignment pins 154 extending from thermal member 34. Single unit 140 is aligned so that it fits within alignment pins 154. Support member 32 may be physically clamped to thermal member 34 or it may be magnetically held in place.

Once single unit 140 is aligned on thermal member 34, automated optical filter selection apparatus 20 operates in the following manner. Thermal member 34 is turned on so that thermal member 34 emits heat. Thermal member 34 warms support member 32 and transmits heat to filter array 122. As filter array 122 heats up, any remaining material 130 (see FIG. 6) becomes less sticky and more fluid. By locating wire 98 within slit 128, individual squares 102 of wire mesh 100 retain optical filters 120 in place and within filter array 122 even if all material 130 is removed. In addition, top frame 40 and bottom frame 42 of optical filter aligner/separator 30 are made from a material that expands when heated, such as aluminum. Wire 98 is made from material such as stainless steel, aluminum has a higher coefficient of thermal expansion than stainless. Thus, optical filter aligner/separator 30 expands more than wire 98, which allows wire 98 to become more taut when device is heated.

Thermal member 34 and robotic arm 46 are fixed in place. Through alignment pins 144 and 154, the robotic arm 46 can access any hole 102 in mesh grid 100. Robotic arm 46 is programmed with the pitch of wires 98 so that the spacing of the holes 102 is known. The location of the filter array 122 within mesh grid 100 must be determined so that robotic arm 46 can access a selected optical filter.

Robotic arm 46 is controlled electronically and is connected to a supervisory control system. A supervisory control system records the location and characteristics of the optical filters in the filter array. The supervisory control system then directed the robotic arm to select certain optical filters for deposit in a pallet. In order to determine the location of each individual optical filter 120, a reference point in the optical filter array is located by robotic arm 46. An operator moves robotic arm 46 to a specific square 102 and assigns that square as the filter array datum. The filter array datum may be an outside corner of filter array 122.

Once the filter array datum is defined, robotic arm 46 calculates an offset based on a distance between a mesh grid reference point and the filter array datum. This offset is used to convert from the filter array coordinate system to the mesh grid coordinate system. Once the offset is calculated, robotic arm 46 sends the offset to the supervisory control system. The supervisory control system knows the mesh grid coordinate system and knows the location of each optical filter 120 in filter array 122, which is the filter array coordinate system. Once robotic arm 46 sends the offset information, the supervisory control system adds the offset to the filter array coordinate system and then instructs robotic arm 46 to retrieve a selected optical filter at a specific location or coordinate. For example, if supervisory control system desires to retrieve an optical filter at location x, y in the filter array, supervisory control system instructs robotic arm 46 to move to this optical filter at location x+a, y+b in the mesh grid, where a and b represent the offset.

Robotic arm 46 selects optical filter 120 and moves optical filter 120 in the following manner. Robotic arm 46 has an end 160, with an opening 162. Robotic arm 46 selects a specific optical filter 120, moves to first station 22, and then moves end 160 directly over selected optical filter 120. Robotic arm 46 is energized and draws air into opening 162 so that end 160 acts like a vacuum. When robotic arm 46 initiates the vacuum action, optical filter 120 is pulled to end 160. Optical filter 120 moves easily to end 160 because any remaining material 130 (see FIG. 6) is no longer sticky because material 130 has been heated and has fluid properties. In addition, end 160 may be heated so that material 130 does not cool and collect on end 160. End 160 may be heated through a heating element (e.g., a resistive heating element) positioned proximate end 160.

Robotic arm 46 then moves to second station 24, and aligns with a specific dimple 164 located on a specific pallet 44. Robotic arm 46 stops drawing air into opening 162, which turns the vacuum action off. Robotic arm 46 then blows air out opening 162 to assist with the release of optical filter 120 into dimple 164 onto pallet 44. After robotic arm 46 moves a set number of optical filters 120 to pallet 44, robotic arm 46 moves to third station 170, which is a cleaning station for end 160.

Figure 10:
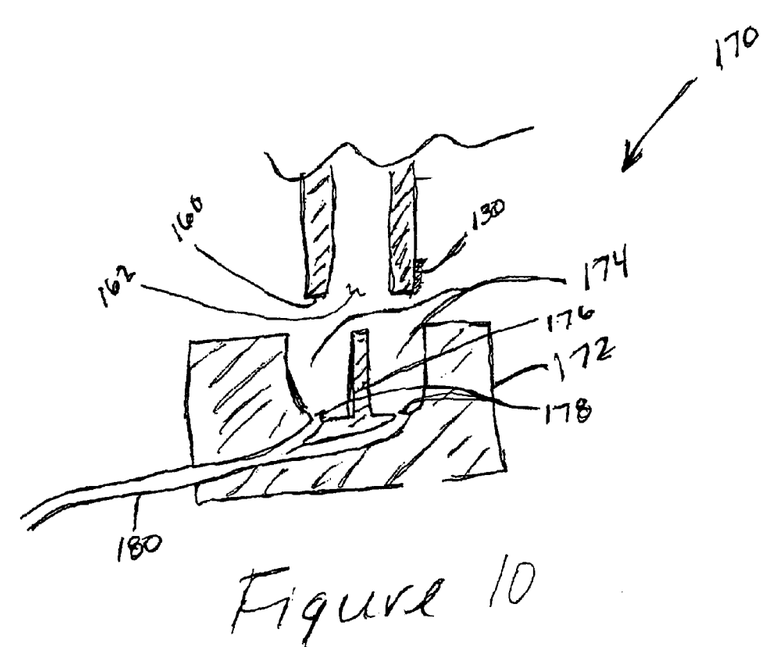
FIG. 10 is a cross-section of third station of FIG. 9.

Referring to FIG. 10, a cross-section of third station 170 is illustrated. Third station 170 allows end 160 to be cleaned on any excess material 130. Third station 170 is a metal block 172 with a recess 174 and a post 176 located in recess 174 extending from the bottom of recess 174. Recess 174 receives end 160 so that post 176 is inserted into opening 162 located at end 160.

Block 172 is heated so that when end 160 is located in recess 174, any excess material 130 on end 160 turns from a sticky adhesive material to a more fluid material. Block 172 surrounds end 160 allowing more heat to transfer to end 160. In addition, an opening 178 is coupled to a hose 180, which draws air through opening 178 to hose 180. This provides a vacuum that removes the fluid material 130 from end 160 and recess 174. The heat and suction allow material 130 to be removed and discarded from end 160. Robotic arm 46 then moves back to first station 22 (see FIG. 9) to continue removing optical filters 120 from optical filter aligner/separator 30 and moving optical filters 120 to second station 24.

Referring to FIGS. 1–9, optical filter aligner/separator 30 enables optical filter 120 to be picked up by robotic arm 46, which can then move optical filter 120 to pallet 44. Optical filter aligner/separator 30 maintains the location of optical filter 120 after material 130 is removed from filter array 122. The use of optical filter aligner/separator 30 along with robotic arm 46 allows the operation to be controlled electronically and by a supervisory control system, which then allows the process to be automated. Optical filter aligner/separator 30 also helps to eliminate waste because a selected optical filter 120 can be removed from optical filter aligner/separator 30 without disturbing the positional relationship of optical filters 120 surrounding the selected optical filter 120.

While apparatus 20 and optical filter aligner/separator 30 has been described as being utilized in the optical filter industry, apparatus 20 and optical filter aligner/separator 30 can be employed in any industry in which individual parts of a larger device are selected and moved from one location to another location.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An optical filter aligner/separator device for retaining optical filters in a desired position, the optical filters having an optical filter height, the device comprising:
    a top frame having a top frame cut out section;
    a bottom frame having a bottom side and a bottom frame cut out section, said bottom frame coupled to said top frame, said bottom frame cut out section aligning with said top frame cut out section; and
    a wire mesh disposed between said top frame and said bottom frame, said wire mesh disposed at said cut out sections, said wire mesh having a first wire fitting within slits between the optical filters, said wire mesh having a height from said bottom side of said bottom frame that is less than a height of the optical filters.

2. The device of claim 1, wherein said top frame has a bottom surface, said bottom surface includes an edge that contacts said first wire of said wire mesh to apply tension to said first wire.

3. The device of claim 1, wherein said bottom frame is arranged to hold said wire mesh in place.

4. The device of claim 1, wherein said bottom frame includes a plurality of posts extending from a top surface of said bottom frame and a plurality of fasteners extending from said top surface.

5. The device of claim 4, wherein said plurality of posts are parallel to a side of said cut out section.

6. The device of claim 5, wherein said first wire extends from a first post of said plurality of posts across said bottom frame cut out section to a second post of said plurality of posts.

7. The apparatus of claim 6, wherein said a fastener of said plurality of fasteners couples said first wire to said bottom frame.

8. The device of claim 6, further comprising a second wire extending from a third post of said plurality of posts across said bottom frame cut out section to a fourth post of said plurality of posts.

9. The device of claim 8, wherein said first wire and said second wire create said wire mesh.

10. The device of claim 4, wherein said top frame has a bottom surface, said bottom surface has a notch to receive said plurality of posts and said plurality of fasteners, said bottom surface of said top frame contacts said top surface of said bottom frame.

11. The device of claim 1, further comprising a support member, said device mounted on said support member.

12. The device of claim 1, wherein said wire mesh has a coefficient of thermal expansion that is lower than a coefficient of thermal expansion for said bottom frame.

13. An optical filter aligner/separator device for retaining optical filters in a desired position, the optical filters having an optical filter height, the device comprising:
    a top frame having a top frame cut out section;
    a bottom frame having a bottom side and a bottom frame cut out section, said bottom frame coupled to said top frame, said bottom frame cut out section aligning with said top frame cut out section; and
    a wire mesh disposed between said top frame and said bottom frame, said wire mesh disposed at said cut out section, said optical filters being separated by slits so that when the top and the bottom frames are pushed down over the optical filters, the wire mesh penetrates into the slits to a depth between an upper height and a lower height of the optical filters.

14. The device of claim 13, wherein said top frame has a bottom surface, said bottom surface includes an edge that contacts a wire of said wire mesh to apply tension to said wire.

15. The device of claim 13, wherein said bottom frame is arranged to hold said wire mesh in place.

16. The device of claim 13, wherein said bottom frame includes a plurality of posts extending from a top surface of said bottom frame and a plurality of fasteners extending from said top surface.

17. An optical filter aligner/separator device for retaining optical filters in a desired position, the optical filters having an optical filter height, the device comprising:
    a top frame having a top frame cut out section;
    a bottom frame having a bottom side and a bottom frame cut out section, said bottom frame coupled to said top frame, said bottom frame cut out section aligning with said top frame cut out section; and
    a wire mesh disposed between said top frame and said bottom frame, said wire mesh disposed at said cut out section, said wire mesh having a height from said bottom side of said bottom frame that is less than the optical filter height,
    wherein outer side dimensions of the top frame and the bottom frame are substantially equal, and the two frames fit within alignment pins extending upward from a support member.

* * * * *